July 4, 1950 — J. LYMAN — 2,513,340
ANGULAR VELOCITY RESPONSIVE APPARATUS
Filed Oct. 17, 1945 — 2 Sheets-Sheet 2
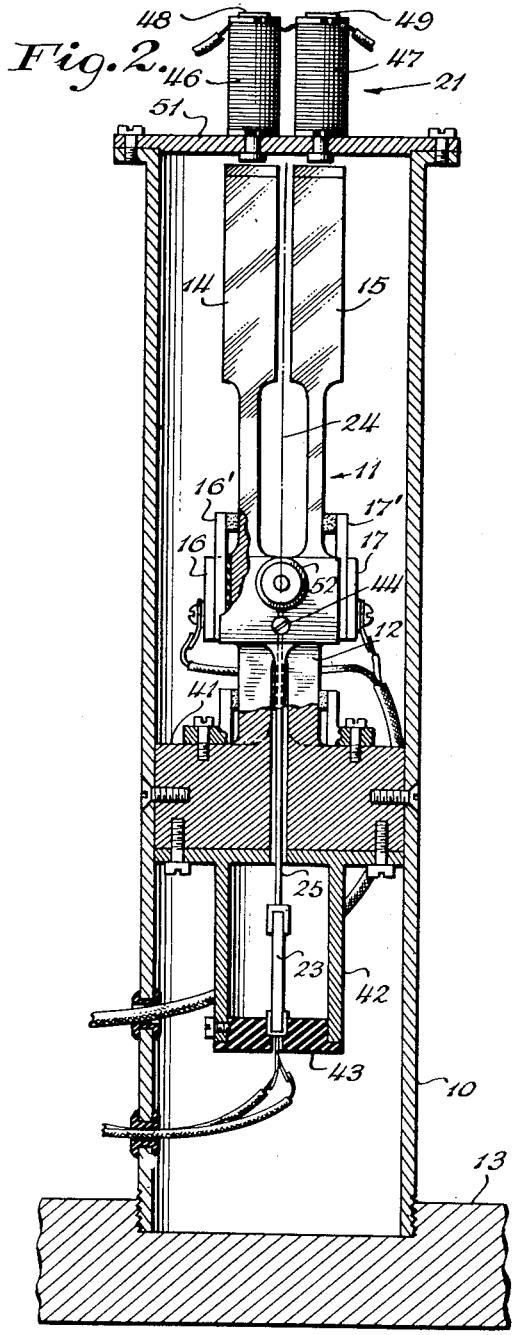
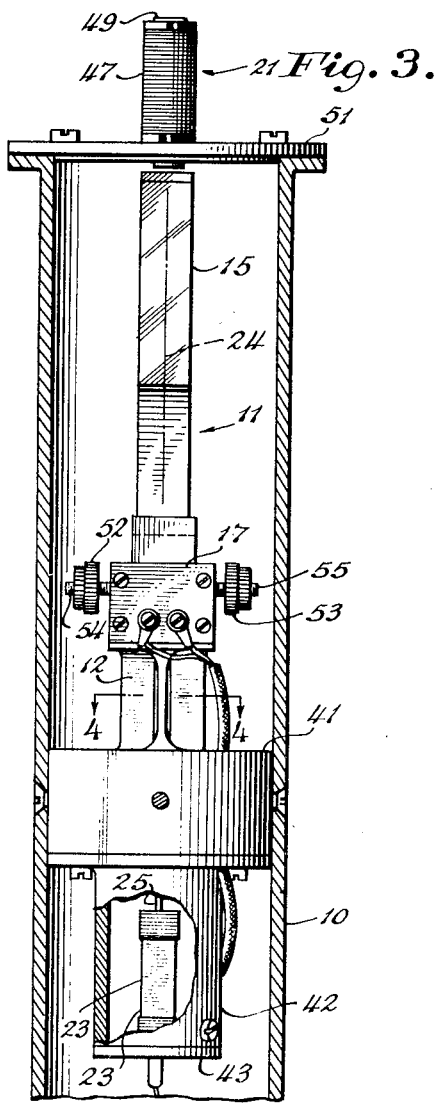
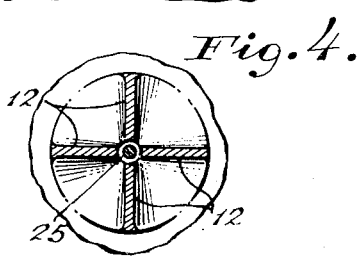
INVENTOR
JOSEPH LYMAN Patented July 4, 1950

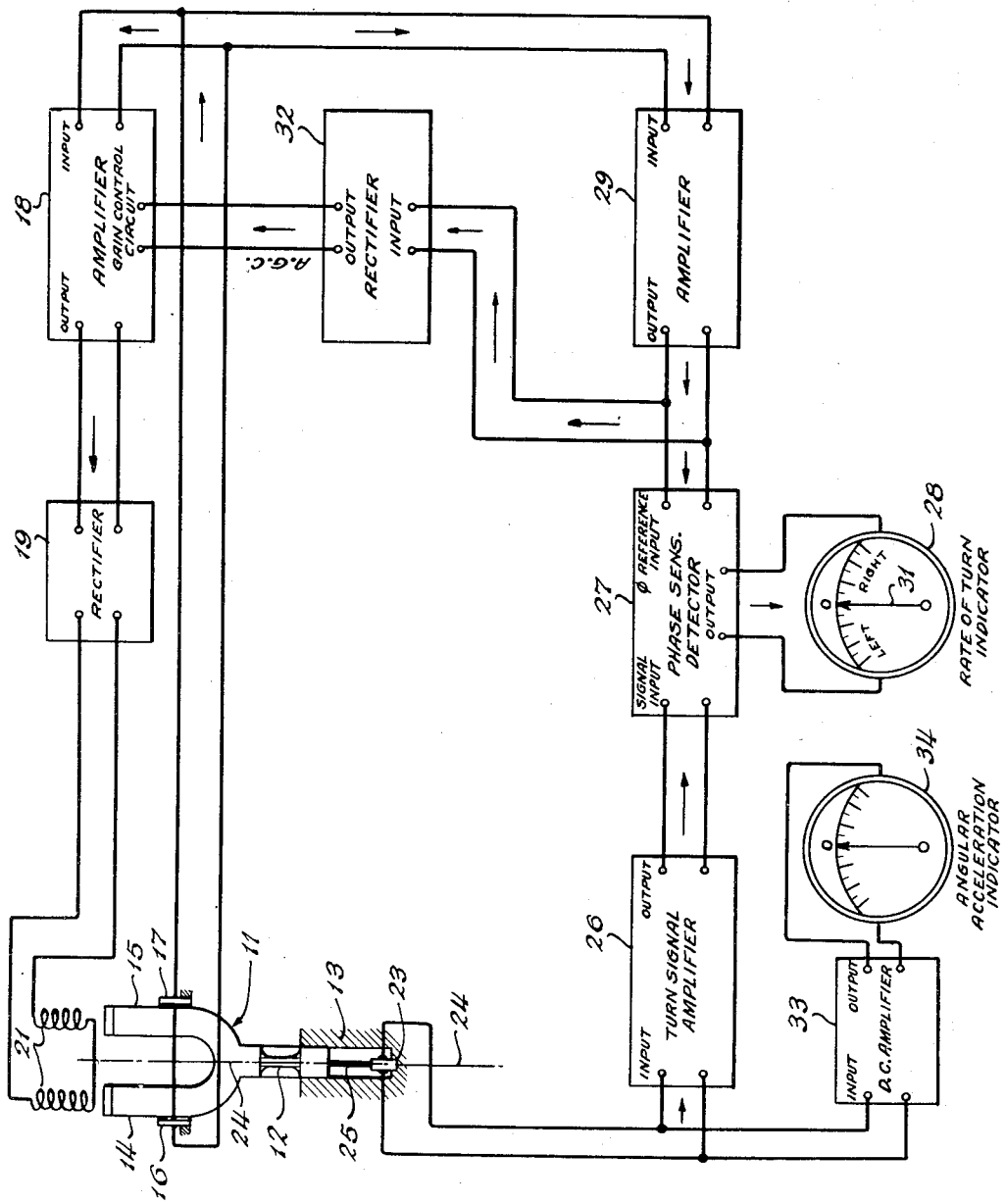

2,513,340

UNITED STATES PATENT OFFICE 2,513,340

ANGULAR VELOCITY RESPONSIVE APPARATUS

Joseph Lyman, Huntington, N. Y., assignor to The Sperry Corporation, a corporation of Delaware Application October 17, 1945, Serial No. 622,739

15 Claims. (Cl. 264—1)

The present invention relates to orientation responsive apparatus, and more particularly to apparatus for detecting a turn or change of orientation. Such apparatus may be employed for determining the rate and direction of change of attitude of a movable craft.

An object of the present invention is to provide an improved instrument for indicating changes of orientation.

A further object of the present invention is to provide an improved instrument for detecting the rate of turn or change of orientation of a body, or for detecting both angular velocity and angular acceleration of a body.

In accordance with the present invention, a mass is elastically supported by a base and is arranged so that its moment of inertia relative to a selected axis is periodically varied. Upon rotation of the base, the mass is constrained by its elastic connection to rotate along with the base, but its inertia compels it to lag slightly behind the base in rotation about the selected axis, by an average angle of displacement substantially proportional to the angular acceleration of the base. Moreover, since the moment of inertia of the mass about the selected axis is alternately increasing and decreasing periodically, the relative angular displacement between the base and the mass varies periodically and synchronously with the variation of the moment of inertia of the mass. The amplitude of the periodic variation of angular displacement between the mass and the base is substantially proportional to the rate of change of orientation of the base about the selected axis, i. e., substantially proportional to the angular velocity of the base. An example of such a mass is a leaf spring clamped at one end, and preferably weighted at the other, so that it is forced to turn with the body about the major axis of the spring or an axis parallel thereto, but may vibrate like one tine of a tuning fork across said axis.

According to a further feature of the present invention, the mass may comprise two bodies elastically connected to the base and symmetrically disposed about the selected axis, and arranged so that the bodies move alternately toward and away from each other, so that the moment of inertia of the symmetrical mass about the selected axis may be varied with minimum reaction coupling to the base. The two massive bodies may comprise the tines of a tuned fork, which may be elastically coupled to the base at the junction of the two tines.

In accordance with still further features of the present invention, a phase-sensitive detector system and a torsional vibration pickup device may be employed in conjunction with the tuned fork and the base for detecting or for indicating the relative phase and amplitude of torsional vibrations or periodic variations of angular displacement between the fork and the base, and thus for determining the angular velocity of the base about the selected axis.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

An embodiment of the present invention will now be described with reference to the accompanying drawings, wherein:

Fig. 1 is a schematic diagram of an embodiment of the present invention;

Fig. 2 is a front elevation, partly in section, of a tuned fork assembly with an exciter unit and vibration pickup devices;

Fig. 3 is a side elevation, partly in section, of the assembly shown in Fig. 2; and Fig. 4 is a cross-sectional view taken along the line 4—4 in Fig. 3.

Referring now particularly to Fig. 1, there is shown a tuned fork 11 connected by an elastic constraining portion 12 to a base 13.

The fork 11 comprises two tines 14 and 15 of substantially equal size and weight, the two tines being arranged for vibration in their plane, alternately toward and apart from each other, and being resonant at a predetermined fundamental frequency of vibration.

A pair of vibrational pickup devices 16 and 17 is attached to the tines 14 and 15 near the junction of the tines with the elastic constraining portion 12. These pickup devices, which may take the form of Rochelle salt crystal pickup devices, are employed for producing an alternating voltage corresponding to the wave form of vibration of the tines 14 and 15.

The pickup devices 16 and 17 are connected in series, and are connected to the input circuit of an amplifier 18, whose output circuit may be connected either directly or through a rectifier 19 to an electromagnetic tuned fork exciter arrangement 21. The electromagnetic exciter arrangement may comprise either a pair of coils having their axes substantially aligned with the tines 14 and 15, or it may comprise a single coil symmetrically disposed beteween the tines 14 and 15 and having its axis aligned for perpendicular intersection of the axes of the tines 14 and 15.

The pickup devices 16 and 17, the amplifier 18, the optional rectifier 19 and the electromagnetic exciter arrangement 21 cooperate to provide an oscillatory circuit for maintaining oscillation in the tuned fork 11 at its fundamental frequency.

Whether the rectifier 19 is necessary in conjunction with the electromagnetic exciter arrangement 21 depends upon the nature of the electromagnetic exciter arrangement. If the exciter coils are so designed that they compel the tines 14 and 15 to move toward each other on both positive peaks and negative peaks of the output voltage of amplifier 18, then the rectifier 19 should be employed. On the other hand, if the magnetic design factors of the exciter arrangement 21 are such that tines 14 and 15 are drawn together only during amplifier output peaks of one polarity, then the rectifier 19 is obviated. An arrangement of parallel exciter coils 46, 47 having permanently magnetized Alnico cores 48, 49 has been found to operate satisfactorily for sustaining vibration of the tines 14 and 15 at the frequency of the amplifier output voltage without the necessity of a rectifier 19.

A further or torsional vibration pickup 23 is arranged for producing an output voltage corresponding to relative angular displacement or torsional vibration between the tuned fork 11 and the base 13, about the axis of symmetry 24 of the tuned fork 11. The pickup device 23 may comprise still another Rochelle salt crystal unit. The torsion pickup 23 has a stator portion rigidly connected to the base 13, and it has a relatively movable portion connected through a stiff rod 25 to the tuned fork 11. For this purpose, the rod 25 passes along the axis 24 in spaced relation to the base 13 and to the elastic constraining portion 12 and it is rigidly connected to the fork 11 at the junction of the tines 14 and 15.

In Figs. 2, 3 and 4 are shown the mechanical details of the tuned fork 11. As shown in these views, the tuned fork 11 is enclosed within a tubular supporting member 10 which is rigidly fastened into the base 13. The base 13 and the tubular housing 10 may be made of brass, for example. A brass block 41 is fastened in position as shown within the tubular housing 10, and is employed for supporting the fork 11 through the elastic torsional constraining portion 12.

Pickup devices 16 and 17 are mounted at the bases of tines 14 and 15 near their junction with the elastic constraining member 12. The movable arms 16' and 17' of the pickup devices 16 and 17 are coupled to the tines 14 and 15 a short distance above the junction of the tines. As illustrated in Figs. 2 and 3, the cross-sectional dimensions of the tines 14 and 15 may be varied along their length for controlling the vibrational characteristics of the fork 11 as desired.

The crystal pickup unit 23 for producing an output voltage varying as the relative angular or torsional displacement between the fork 11 and the base 13 may be rigidly connected to the base 13 through a tubular inner housing member 42 which may be attached, in turn, to the block 41. An insulated bottom portion 43, which may be made of Bakelite, for example, is fastened in the bottom of the inner housing member 42 and is arranged to receive the bottom portion of the crystal pickup unit 23. The connection of the upper portion of the crystal pickup unit 23 through the rigid rod 25 is clearly shown in Fig. 2. The rod 25 extends along the axis of symmetry 24 of the fork 11 through a conformal cylindrical opening at the junction of the tines 14 and 15, and a set screw 44 is provided for clamping the rod 25 to the fork 11 in a stress-free condition after the system has been assembled.

The exciter unit 21, illustrated in Figs. 2 and 3, comprises a pair of coils 46 and 47 cooperating with core rods 48 and 49. These rods are secured in a brass top plate 51 which cooperates with the cylindrical housing 10 to complete the enclosure of the fork 11 and the pickup units associated therewith. The lower ends of the core members 48 and 49 are so situated that a very small spacing is provided between these ends and the ends of the tines 14 and 15, respectively, so that an efficient magnetic excitation circuit is provided.

It is important for precise operation of the structure illustrated in the Figs. 2, 3 and 4, if the turn-responsive apparatus is designed for high sensitivity, that the mass in the fork 11 be perfectly symmetrical about the axis of the rod 25 and the apparent axis of symmetry 24 of the fork 11. To aid in securing the desired accurate distribution of mass of the assembly, one or more adjustably positioned mass units may be attached to the fork 11. Two adjustable mass units 52 and 53 are shown positioned on mass adjustment screws 54 and 55, for aid in balancing the system illustrated in Figs. 2, 3 and 4 and in tuning, the natural period of torsional oscillation to match the tuning fork frequency.

It will be readily apparent that the elastic constraining section 12 through which the fork 11 is secured to the base 13 could take any of a wide variety of forms. For high sensitivity of the system, it is desirable that the torsional stiffness of this constraining section be small, in order that appreciable deflection of the fork about its axis 24 will result from the application of a small torque. At the same time, it is desirable that the constraining section 12 have high stiffness relative to bending forces, in order to retain the axis of the fork 11 aligned with the axis of the cylindrical housing 10. For this purpose, the constraining section 12 may be made in the form illustrated in Figs. 2 and 3, the cross-sectional form being as shown in Fig. 4.

Returning again to Fig. 1, there are shown circuits and apparatus in conjunction with the fork 11 and vibration sustaining system 16, 17, 18, 19, 21 for providing a measure of the angular velocity and a measure of the angular acceleration of the base 13 about the axis 24 of the fork 11.

The electric output circuit of the angular displacement pickup device 23 is connected to the input circuit of an amplifier 26, whose output circuit is connected to the signal input circuit of a phase-sensitive detector 27, which may be of the well-known balanced modulator type. The output circuit of the phase-sensitive detector 27 may be arranged for producing a direct voltage of polarity dependent upon the input signal phase and of magnitude dependent upon the input signal amplitude. This direct output voltage may be supplied to a galvanometer 28 employed as a rate-of-turn indicator.

As is well known, the phase-sensitive detector 27 requires a reference phase input signal, so that the output voltage will be compelled to vary in polarity according to relative changes of input signal phase. For this purpose, the output voltage of pickup units 16 and 17 may be applied to the input circuit of an amplifier 29, whose output circuit is connected to the phase reference input terminals of the phase-sensitive detector 27.

While the base 13 of the apparatus shown in Fig. 1 remains in fixed orientation, no torque is applied to the elastic constraining section 12, and the tuned fork 11 therefore remains in neutral angular positional relation to the base 13 with respect to the axis 24 of the tuned fork 11. During rotation of the base 13 about the axis 24, on the other hand, the elastic constraining section 12 connecting the fork 11 to the base 13 compels the fork 11 to turn substantially with the base 13. Since the fork 11 has appreciable inertia, its moment of inertia about the axis 24 being determined principally by the mass of the tines 14 and 15 and the spacing of these tines from the axis 24, and since the torsional constraining section 12 has torsional elasticity, the rotation of the base 13 about the axis 24 is accompanied by some torsional deflection of the section 12 and a small relative angular displacement of the fork 11 and the base 13 about axis 24, which is in substantial synchronism with the tuning fork.

Moreover, the angular displacement between the fork 11 and the base 13 varies according to the moment of inertia of the fork 11 about the axis 24, and this moment of inertia in turn varies periodically with the variation of spacing of tines 14 and 15 from the axis 24.

The periodic relative angular positional variations between the fork 11 and the base 13 are consistent with the law of conservation of angular momentum. If the base is rotating at constant speed, it will be necessary that the speed of rotation of the fork increase as its moment of inertia about the axis of rotation decreases, and decrease as the moment of inertia increases, all in synchronism with the fork oscillations, in its tendency to satisfy the condition of substantially constant angular momentum.

The axial pickup device 23 produces an alternating voltage corresponding to this periodic variation of angular displacement. This alternating voltage is of the same frequency as that of the fork and varies in magnitude and in phase relation to the phase of the output voltage of pickup devices 16 and 17, according to the rate of rotation of base 13 about axis 24 and the direction or sense of the rotation. Accordingly, the phase-sensitive detector 27 is enabled to provide an output signal which unambiguously indicates the character of the change of orientation of the base 13.

In order that the deflection of the point 31 of the rate-of-turn indicator 28 be made to vary in a predetermined relation to the rate of change of orientation of the base 13, it is necessary that the amplitude of the periodic change in the moment of inertia of the fork 11 be maintained substantially constant. Thus, it is necessary that the vibration of the tines 14 and 15 be accurately regulated to a substantially constant amplitude. For this purpose, an automatic gain-control circuit is employed in conjunction with the vibration sustaining amplifier 18. The output voltage of amplifier 29 is rectified and applied to the automatic gain-control terminals of the amplifier 18.

The rectifier unit 32 receives from amplifier 29 an alternating voltage of amplitude proportional to the amplitude of vibration of the tines 14 and 15, and supplies a proportionate rectified voltage to the gain-control terminals of amplifier 18. The direct voltage supplied by the rectifier may be employed for bias potential variation of a variable-mu amplifier in a well-known manner, or may be used for automatic gain control in any desired arrangement of amplifier 18.

During a uniform angular acceleration of the base 13 about the axis 24, the amplitude of the alternating component of output voltage from pickup device 23 increases steadily and, in addition, a unidirectional voltage component is produced by the device 23 corresponding to the angular acceleration of the base 13. During an angular deceleration of the base 13, an opposite direct voltage is produced by the pickup device 23. The direct voltage output of pickup device 23 represents an accurate measure of the angular acceleration of the base 13 about axis 24. Accordingly, a direct-current amplifier 33, which may be of the direct-coupled type, may be connected to the pickup device 23 to receive and amplify the direct or unidirectional component of voltage produced thereby; and the output of the amplifier may be connected to a galvanometer 34 employed as an acceleration indicator. If a piezoelectric crystal device is employed as the pickup unit 23, the input impedance of the direct-current amplifier 33 should be very high, in order that prolonged accelerations may be registered by the acceleration indicator 34.

It will be seen from the foregoing remarks that the present invention is fundamentally ideally adapted both for use as an accurate, rugged and reliable rate-of-turn indicator and for use as an angular acceleration indicator, and it will be further seen that a combined rate and acceleration indicating system is provided without sacrifice of simplicity.

The angular velocity and acceleration instrument provided by the present invention may be used for a wide variety of applications. It may be used as a rate-of-turn indicating instrument for an aircraft, wherein the fork 11 is mounted with the axis 24 normally vertical, but for best results the natural frequency and tuning of the fork should be the same for transverse as the torsional oscillations. It is useful, also, for making scientific measurements, and for demonstrating physical principles, as for example, for providing an indication of the earth's rotation.

It is not necessary for the purpose of the present invention that a tuned fork 11 be employed as the device for periodic variation of moment of inertia. Any suitable arrangement for periodically varying the moment of inertia of a mass may be employed for this purpose.

Moreover, it is not necessary for the present invention that piezoelectric crystal units be employed as vibration pickup devices. Any device suitable for producing an output signal varying according to movement may be employed.

While the signal voltage produced by pickup device 23 is illustrated only as employed to produce indications of angular velocity and acceleration, this voltage may be employed for a variety of other uses. For example, the reversible-phase alternating component of the output of pickup unit 23 may be employed for control of a servo mechanism, either for directly rotating the base 13 of the tuned fork assembly, or for automatic control of a craft, the invention being used as an orientation responsive device for craft stabilization.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A turn indicator for vehicles comprising a weighted leaf spring elastically clamped at one end, so that it is forced to turn with the vehicle abut an axis parallel to the spring but is free at its weighted end to vibrate at its natural period about a transverse axis, means for maintaining such vibration, said spring also having a natural torsional period equal to the aforesaid vibrational period, and means for detecting and measuring the amplitude and phase of said torsional vibration as an indication of the rate and direction of turn of the vehicle.

2. A turn indicator for indicating orientation about an axis comprising a base which orients about such axis, a movable mass elastically coupled to said base with sufficient stiffness to force orientation of said mass with said base, but with sufficient resilience to permit a natural torsional period of oscillation, the elasticity of said mass also permitting free vibration alternately toward and away from said orientation axis of the same at a natural frequency the same as that of said torsional oscillation, and means for detecting and measuring the amplitude of the torsional oscillations about said axis for indicating the rate of orientation.

3. A turn indicator for vehicles, comprising a base, a movable mass elastically connected to said base, periodic means for vibrating said mass substantially toward and away from an axis, means for detecting periodic variations of relative angular displacement of said mass and said base about said axis for deriving a measure of angular velocity of said base, and means for detecting variations of average relative angular displacement of said mass and said base about said axis for deriving a measure of angular acceleration of the vehicle.

4. Apparatus responsive to changes of orientation comprising a base, a plurality of movable masses normally positioned symmetrically about an axis therebetween, motive means for alternately drawing said masses toward said axis and repelling them from said axis, elastic torsional constraining means connecting said masses to said base, and means responsive to variations of orientation of said masses and said base about said axis for detecting rotation of said base about said axis.

5. Apparatus as defined in claim 4, further including means responsive to the amplitude of movement of said masses for regulating said motive means to suppress changes of vibration amplitude of said masses.

6. Orientation responsive apparatus comprising a base, a fork having two tines elastically interconnected, means for vibrating said tines alternately toward each other and apart from each other, elastic torsional constraining means connecting said fork to said base for permitting angular positional variations between said fork and said base according to variations of torsion in said elastic means, and means responsive to said angular positional variations for detecting rotation of said base.

7. A rate of turn indicator comprising a base subject to being turned, a tuned fork having two tines elastically coupled to said base adjacent the junction of said tines, means for vibrating said tines periodically and rapidly so as to vary the space between the free ends of the same, and means responsive to variations in the twist between the junction of said tines and said base for detecting rotation of said base.

8. Orientation responsive apparatus comprising a base, a tuned fork having two tines elastically connected to said base, means responsive to vibration of said tines for applying vibration sustaining forces to said fork substantially at resonance therewith for periodically varying the spacing between said tines, and means responsive to relative twist of said fork and said base about an axis of symmetry of said tines producing a signal upon rotation of said base.

9. Apparatus responsive to change of orientation, comprising a base, a fork having two tines, means for vibrating said tines alternately toward each other and apart from each other, elastic torsional constraining means connecting said fork to said base for permitting a relative angular positional variation between said fork and said base according to variation of torsion in said elastic means, and phase-sensitive detector means responsive to said relative angular positional variation for detecting the amplitude and phase thereof relative to the phase of vibration of said tines accompanying rotation of said base.

10. Apparatus as defined in claim 9 further including means responsive to a unidirectional component of relative angular positional variation between said fork and said base for providing a measure of angular acceleration of said base.

11. A rate of turn indicator comprising a base, a tuned fork having two tines elastically connected to said base, means responsive to movement of said tines for applying to said fork vibration sustaining forces substantially in resonance therewith, means responsive to relative twist between said fork and said base for providing an alternating voltage varying with rotation of said base, and phase-sensitive detector means responsive to movement of said tines for providing a measure of the amplitude and the phase of said alternating voltage relative to the movement of said tines.

12. Apparatus responsive to change of orientation, comprising a base, a tuned fork having a plurality of tines resiliently connected to said base, electromagnetic means for varying the spacing between said tines in accordance with an applied voltage, vibration-responsive means for producing a voltage varying according to the vibration of said tines, amplifier means responsive to the output of said vibration-responsive means and connected to said electromagnetic means for periodically varying the spacing between said tines at a frequency determined by the characteristics of said tuned fork, a phase-sensitive apparatus, means for supplying to said phase-sensitive apparatus a phase reference signal derived from said vibration-responsive means, and means responsive to torsional vibrations between said tuned fork and said base for delivering to said phase-sensitive apparatus an alternating voltage varying according to relative variations of position of said fork and said base about the axis of said fork.

13. Apparatus as defined in claim 12, further including means responsive to an amplified version of the output of said vibration-responsive means for varying the gain of said amplifier inversely according to variations of strength of the vibration of said fork, whereby variations of vibration amplitude of the tines of said fork are suppressed.

14. A turn indicator for indicating the rate-of-turn of a craft about an axis, comprising a tuning fork-like structure mounted with its stem parallel to said axis, means for maintaining the vibration of said tuning fork at a constant amplitude, a piezoelectric crystal pickup device connected to said stem in such manner that alternating stresses are applied thereto by the alternating variations in torsion in said stem due to a turn, and a rate-of-turn indicator actuated by the alternating output of said crystal.

15. A turn indicator as claimed in claim 14, wherein the frequency of the alternating output of said crystal is the same as the period of the tuning fork and the amplitude of the electromotive force varies with the rate of turn.

JOSEPH LYMAN.

REFERENCES CITED

The following references are of record in the file of this patent:

UNITED STATES PATENTS

| Number | Name | Date |
| --- | --- | --- |
| 1,728,904 | Herr | Sept. 17, 1929 |
| 2,231,439 | Dudenhausen | Feb. 11, 1941 |
| 2,266,449 | Ullrich | Dec. 16, 1941 |
| 2,309,853 | Lyman | Feb. 2, 1943 |

FOREIGN PATENTS

| Number | Country | Date |
| --- | --- | --- |
| 289,862 | Great Britain | Aug. 6, 1929 |
| 692,497 | Germany | June 20, 1940 |